Figure 1:
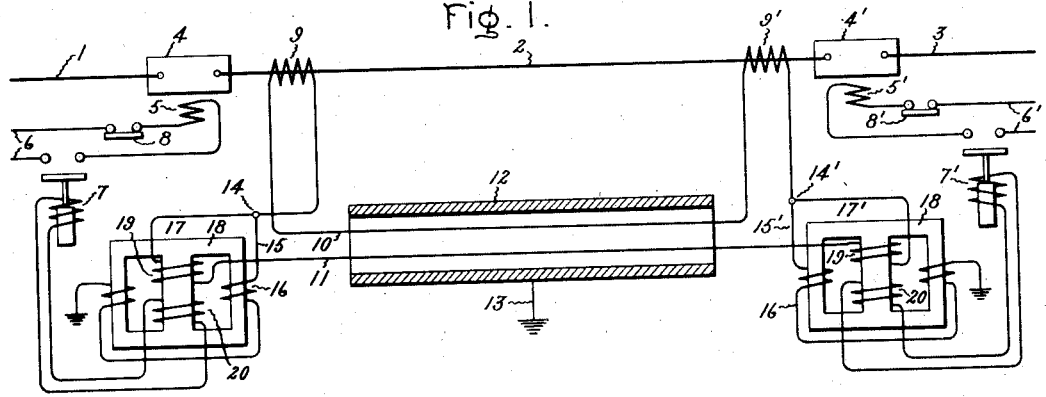

Sept. 18, 1923.

A. S. FITZ GERALD 1,468,441

PROTECTIVE DEVICE FOR ELECTRIC DISTRIBUTION SYSTEMS

Filed Sept. 9, 1922

2 Sheets-Sheet 1

Inventor:
Alan S. Fitz Gerald,
by
His Attorney.

Sept. 18, 1923.

A. S. FITZ GERALD 1,468,441

PROTECTIVE DEVICE FOR ELECTRIC DISTRIBUTION SYSTEMS

Filed Sept. 9, 1922    2 Sheets-Sheet 2

Inventor:
Alan S. Fitz Gerald,
by *Albert G. Davis*
His Attorney.

Patented Sept. 18, 1923.

1,468,441

UNITED STATES PATENT OFFICE.

ALAN STEWART FITZ GERALD, OF LONDON, ENGLAND, ASSIGNOR TO GENERAL ELECTRIC COMPANY, A CORPORATION OF NEW YORK.

PROTECTIVE DEVICE FOR ELECTRIC DISTRIBUTION SYSTEMS.

Application filed September 9, 1922. Serial No. 587,194.

*To all whom it may concern:*

Be it known that I, ALAN STEWART FITZ GERALD, a subject of the British Empire, residing at London, England, have invented certain new and useful Improvements in Protective Devices for Electric Distribution Systems, of which the following is a specification.

My invention relates to alternating current electric apparatus or circuits comprising electro-responsive devices or relays, and has special reference to cases in which operation is dependent on the relative magnitudes or other variable conditions of a plurality of electrical effects. Such requirements are generally met by the use of special forms of relay, commonly referred to as balanced, biased, or differential relays, in which separate windings are provided for the differing electrical effects, these being wound to oppose or assist each other as may be required, either directly or through mechanical effects produced by them.

One object of my invention is to provide apparatus by means of which the relations between a plurality of electrical effects may control the desired operation through the agency of a simple relay, or electro responsive device having in itself no differential or biasing device.

My invention also relates to protective systems and devices operating on a balanced voltage electric distribution system, in which the input of electrical energy to the section protected is normally balanced against the output therefrom, and in which any difference between the input and output being an essential result of faulty conditions on the section protected, operates relays or other devices whereby the circuit breakers controlling the section may be opened or other desired effects obtained.

It is well known that in such systems difficulty is met due to the capacity current flowing in the pilot cables, if severe faults in remote parts of the distribution system are fed through the section protected. Various methods have been devised to overcome this difficulty, some of which can only be carried out at considerable additional cost and necessitate special adjustment in the magnitude of the balancing condenser according to the length of the pilot line. This is not conveniently carried out without additional apparatus or costly balancing condensers. According to another method, the effect of undesired capacity current is neutralized by another of proportional magnitude but having a phase difference. This necessitates the use of an electro-mechanical balancing relay. In still another method, advantage is taken of the fact that a faulty current flowing to earth will usually have its magnitude restricted within definite limits due to the resistance through which the alternator neutral is earthed. Cases arise where this limitation does not hold good, however, as in certain systems, the neutral point is earthed directly without any limiting resistance.

Another object of my invention is to provide means whereby a capacity current effect of any magnitude may be directly compensated. A further object is to provide a method of achieving the above without the use of a special pilot cable or additional balancing condensers and in a cheap and simple manner.

The nature of the capacity current flowing under overload conditions in the secondary circuit of a protective system is such that the pilot cable may be considered to represent a capacity existing between each adjacent conductor and also a capacity between each conductor and earthed covering. It is usual to earth the secondary circuit of a protective system at one or more points. If the earthing, therefore, be effected at any point in the secondary circuit other than one having equal potential displacement from each of the pilot conductors, the capacity current flowing between the conductors and the earthed cover, or a definite fraction thereof, will flow in the earth connection.

According to my invention such a resultant earth capacity current is employed to compensate for capacity current in a pilot conductor.

My invention will be better understood from the following description taken in connection with the accompanying drawing and its scope will be pointed out in the appended claims.

Figure 1 diagrammatically illustrates an embodiment of my invention, and Figs. 2, 3, 4 and 5 diagrammatically illustrate embodiments of modifications of my invention.

In carrying my invention into effect according to one modification illustrated in Fig. 1, I connect in the earthing lead, a winding which may be applied directly or indirectly to the protective relay and which is provided with a number of turns such that the capacity current, flowing in the operating winding of the relay, which will consist of currents flowing into its pilot cable is compensated or balanced by the current flowing between conductors and earth only.

In Fig. 1, I have shown in a single line diagram, for clearness, an embodiment of my invention as applied to an alternating current transmission line comprising sections 1, 2 and 3, one of which, section 2 is shown provided with suitable circuit interrupting devices 4, 4' having trip coils 5, 5' respectively, connected in control circuits 6, 6' respectively. The control circuits 6, 6' are arranged to be controlled by suitable electroresponsive devices or protective relays 7, 7' respectively, operative in response to abnormal circuit conditions on the section 2. The control circuits 6, 6' may also include auxiliary switches 8, 8' associated with the circuit interrupting devices 4, 4' and arranged to be closed when the circuit interrupting devices 4, 4' are closed and to open when the circuit interrupting devices 4, 4' are opened to save the more delicate relay contacts as is well known to the art. For the purpose of energizing the coils of the relays 7, 7', the section 2 may be provided with current transformers 9, 9', the secondaries of which are connected as shown for normally opposing electromotive forces by a secondary or pilot circuit, illustrated as a cable comprising conductors 10 and 11, and a metallic sheath 12 grounded as indicated at 13.

Upon the occurrence of a fault, especially if severe in character, on an alternating current electric system embodying a protective arrangement in which current transformers are connected for opposing electromotive forces, currents of considerable intensity, due to the capacity effect between the pilot wires, tend to circulate therein and thereby to cause operation of the relays. In consequence of this sound or healthy sections of the system are frequently put out of service on through faults even though the power input into a section is substantially equal to the power output therefrom. In accordance with my invention, I prevent this tendency to faulty operation of the protective relays by exerting a counter or restraining effect proportional to the capacity current to ground of the pilot conductors.

In order to make use of this current, I connect one or more points 14, 14' of the pilot circuit, not having equal potential displacement with respect to the pilot wires 10 and 11, to earth by earthing leads 15, 15' respectively, through restraining windings 16, which as illustrated in Fig. 1 are arranged to have their effects applied indirectly to the relays 7, 7' respectively, through the medium of static differential electroresponsive devices or biasing transformers 17, 17'. Each of the biasing transformers 17, 17' comprises a core 18 constructed and arranged to provide a plurality of magnetic circuits. The core 18 may comprise three legs or portions, on the outer two of which the restraining winding 16 is placed and on the inner of which is placed an operating winding 19 which may be connected in series with the pilot circuit, and a secondary winding 20 connected in circuit with the energizing winding of the protective relay 7, 7'. The restraining winding 16 and the secondary winding 20 are arranged so that substantially no transformer action is set up between these windings, while the operating winding 19 and the secondary winding 20 are arranged to have voltages induced in them by mutual induction. Current in the operating winding 19 tends to cause a flux interlinked with the secondary winding 20, the current in which may cause operation of the relay. The restraining winding 16 as before stated exerts no direct transformer action on the secondary winding 20, but the effect of the restraining winding by virtue of the saturation which it sets up in portions of the core common to the magnetic circuits of the restraining and operating windings 16 and 19 respectively, tends to reduce the current in the secondary winding 20, so that a greater current in the operating winding 19 is necessary than would otherwise be the case, if the restraining winding 16 were omitted. Consequently upon the occurrence of a through fault, that is a fault outside of section 2, it is clear that the capacity currents between conductors 10 and 11 will tend to flow in the operating windings 19, thus tending to produce currents in the secondary windings 20 of sufficient magnitude, dependent, of course, upon the severity of the fault, to operate the relays 7, 7', but the capacity currents between conductors 10 and 11 and the earthed sheath 12 flowing through the earthing leads 15, 15' and the restraining windings 16 compensate the effect of the capacity currents between conductors 10 and 11 by limiting the flux of the operating winding 19 interlinked with the secondary winding 20. The relays 7, 7' are therefore prevented from operating to close the control circuits 6, 6' of the circuit interrupting devices 4, 4' so that through faulty conditions even though of severe character will not interrupt continuity of service on sound or healthy portions of the transmission system, and, moreover, since the ratio of the capacity current between conductors to the capacity to earth is substantially constant for any given type of cable, no adjustments will be required for differing lengths of pilot cable.

In the event of the conditions of application being such that it is only convenient to earth the protective system secondary at one point, the relay adjacent thereto may be compensated in the manner set forth above, and may be so arranged that in operating it closes a circuit between the pilot conductors. The relay at the remote end of the line need not be compensated and may be adjusted so that it is not sufficiently sensitive to be operated by capacity current. It will, however, immediately operate on the compensated relay closing, both ends of the section being, therefore, open circuited.

Figure 2:
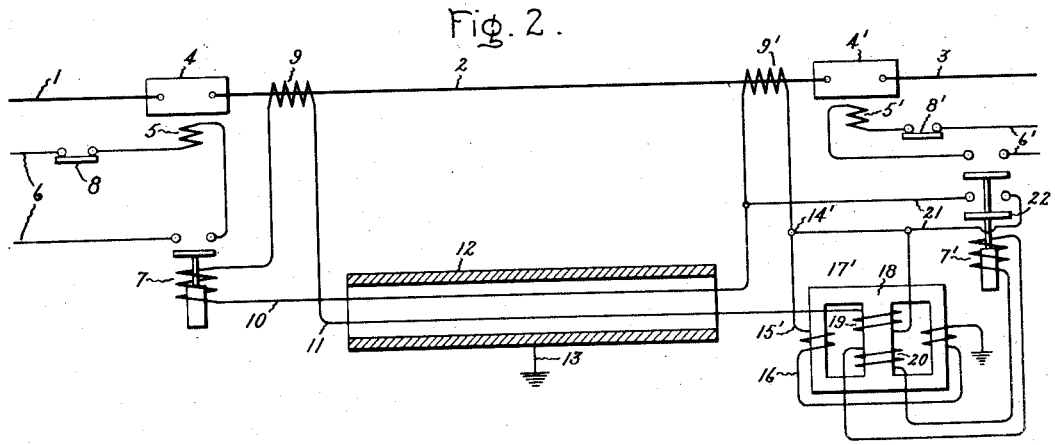

An embodiment of my invention illustrating this arrangement is shown in Fig. 2 in a single line diagram for purposes of clearness. In this case, I connect a point 14' of the pilot wire 11 not at equal potential differances with respect to the pilot wires 10 and 11, and adjacent one end of section 2 to earth by an earthing lead 15' through the restraining winding 16 of a biasing transformer 18. For closing a circuit 21 between the pilot conductors 10 and 11, the relay 7' may be provided with an additional contact controlling member 22. The relay 7 at the other end of section 2 does not in this case have to be compensated for capacity currents between the pilot conductors. With this arrangement, relay 7' may be adjusted to a low fault setting and it will not be caused to operate by capacity currents as heretofore explained, while relay 7 may be adjusted to a relatively high fault setting such that it will not operate on capacity currents. Relay 7' is therefore relatively sensitive to faults on section 2. while relay 7 is not and neither of the relays 7, 7' is responsive to through faults, but upon the operation of relay 7' due to a fault on section 2, relay 7 will receive the full electromotive force of current transformer 9 and therefore be caused to operate immediately upon the operation of relay 7'. Both circuit interrupting devices 4, 4' will therefore be operated and section 2 open circuited.

Such an arrangement would form an efficient system for the protection of a cable wherein a light fault setting is adopted for earth faults, at the end where the pilot cable or secondary system is earthed and a heavy setting for phase faults at the other end is permissible.

Figure 3:
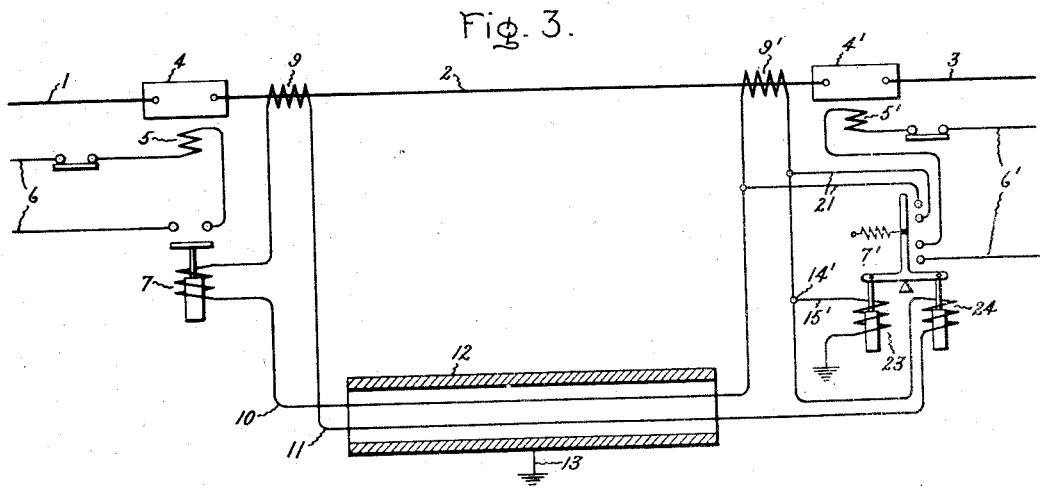

In Fig. 3, I have illustrated an embodiment of my invention similar to that shown in Fig. 2 except that the counter or compensating effect of the capacity current to ground of the pilot conductors 10 and 11 is exerted by a restraining winding 23 connected in the earthing lead 15' and applied directly to the relay 7' instead of indirectly through the medium of a biasing device as in Figs. 1 and 2. The relay 7' illustrated in Fig. 3 may be any well known type of differential relay having its operating winding 24 connected in circuit with one of the pilot wires 11, the operating winding being opposed by the restraining winding 23. Obviously the effect of the capacity current between pilot wires 10 and 11, that is to say, the current in the operating winding 24 will be opposed by the effect of the capacity current between pilot conductors 10 and 11. and ground, that is to say, the current in the earthing lead 15' and the restraining winding 23. Consequently the relay 7' will remain inoperative to close its contacts upon the occurrence of a fault exterior to the section 2.

Figure 4:
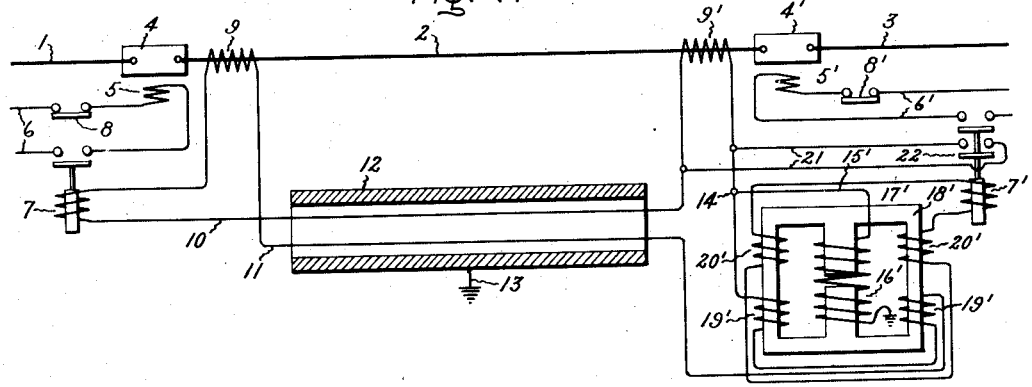
Figure 5:
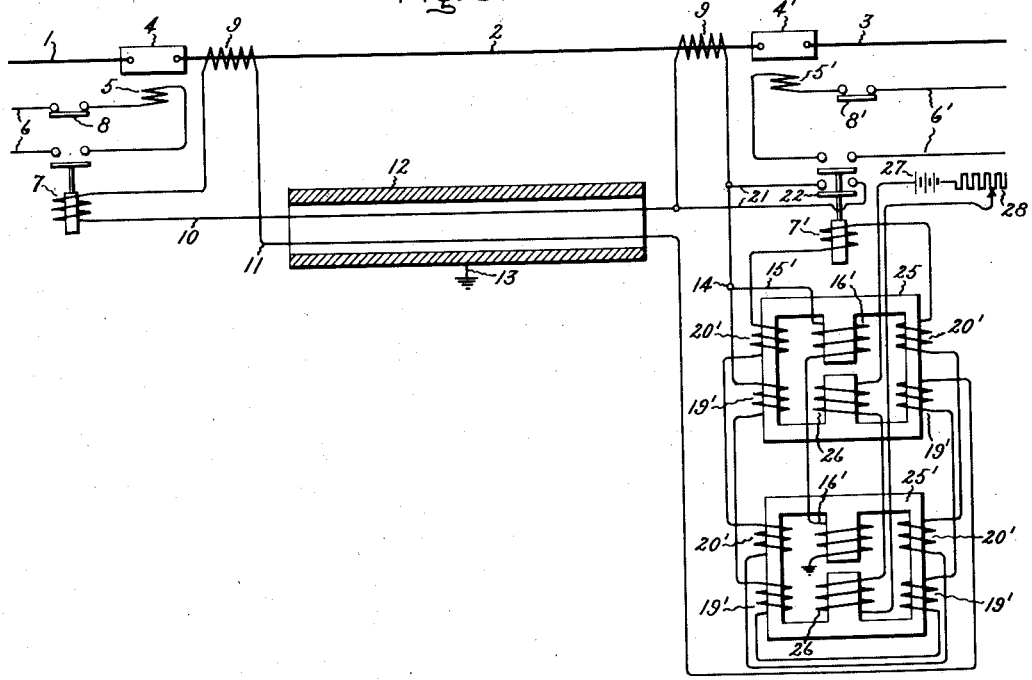

Figs. 4 and 5 illustrate diagrammatically modifications of my invention similar to that shown in Fig. 2, except in the construction and arrangement of the biasing or differential means for controlling the relay 7'. In the embodiment of my invention shown in Fig. 4, the biasing means comprises a transformer 17' having a core 18' constructed and arranged to provide a plurality of magnetic circuits. The core 18' may comprise three legs on the outer two of which are placed divided operating and secondary windings 19' and 20', respectively, inductively related, and on the inner of which is placed a single restraining winding 16' arranged to produce no induced voltage in the secondary winding 20', the restraining winding 16' being in circuit with the earthing lead 15' of the protective circuit. With this arrangement a current flowing in the restraining winding 16' tends to diminish the flux caused by any given current in the operating winding 19' and interlinked with the secondary winding 20', by virtue of the saturation set up in portions of the core 18' common to the magnetic circuits of the restraining and operating windings 16' and 19' respectively. I may also provide the inner leg of the core 18' with an air gap of suitable dimensions, as shown, by means of which it is possible to obtain different useful relations between the operating and restraining excitations under various conditions. Moreover, I may provide additional magnetic circuits and windings, such as above described, if further operating or restraining effects are required. For example, in the embodiment of my invention illustrated in Fig. 5, I have shown an arrangement whereby the operation of the relay 7' may be effected by a plurality of electrical effects under the action of one operating winding and two restraining windings. In this arrangement, I employ two magnetic cores 25, 25' which may be similar to the core 18' shown in Fig. 4. On the outer legs of the cores 25, 25' are distributed operating and secondary windings 19' and 20' mutually inductively associated and on the inner legs restraining windings 16' and 26, as shown, the restraining windings being arranged to produce no induced voltage in the primary and secondary windings 19' and 20'. With this arrangement, the restraining windings are so connected that the electromotive forces generated by the effects of the coils in one restraining circuit on those in the other are in opposition, the restraining winding 16' being as before connected in circuit with the earthing lead 15' of the pilot circuit while the restraining winding 26 may be connected in circuit with a direct current or other source 27 whose effect may be controlled through an adjustable resistance 28. With this arrangement, therefore, the action of the relay 7' is under the control of a plurality of electrical effects arranged to co-operate in the control of the magnetic flux of the primary winding 19' by the saturation effect produced in portions of the cores 25, 25' common to the magnetic circuits of the restraining and operative windings.

What I claim as new and desire to secure by Letters Patent of the United States, is:—

1. In an alternating current electric system, protective means wherein the input of electric energy into a portion of the system is balanced against the output therefrom comprising means for controlling the circuit of the system, a current transformer at each of two points of the system, a pilot circuit having a high capacity to ground comprising pilot wires connecting the secondaries of said transformers for opposing electromotive forces, electroresponsive means for controlling said circuit controlling means connected in series relation with said pilot circuit, an earthing lead connecting a point in said pilot circuit not at equal potential displacement from said pilot wires to ground, means in circuit with said earthing lead arranged to produce an effect on said electroresponsive means proportional to the capacity current to ground of said pilot circuit and opposed to the effect of the capacity current between said pilot wires whereby said electroresponsive means is rendered inoperative in response to the capacity current between said pilot wires.

2. In an alternating current electric system, protective means wherein the input of electric energy into a portion of the system is balanced against the output therefrom, comprising means for controlling the circuit of the system, a current transformer at each of two points of the system, a pilot circuit comprising a cable having an earthed sheath and pilot wires connecting the secondaries of said transformers for opposing electromotive forces, electroresponsive means for controlling said circuit controlling means connected in series relation with said pilot circuit, and earthing lead connecting a point in said pilot circuit not at equal potential differences with respect to said pilot wires to ground, a winding in circuit with said earthing lead arranged to produce an effect on said electroresponsive means proportional to the capacity current to ground of said pilot circuit and opposed to the effect of the capacity current between said pilot wires on said electroresponsive means whereby said electroresponsive means is rendered inoperative in response to the capacity current between said pilot wires.

3. In an alternating current electric system, protective means wherein the input of electric energy into a section of the system is balanced against the output therefrom, comprising means for controlling the circuit of a section of the system, a current transformer adjacent each end of the section, a pilot circuit comprising a cable having an earthed metallic sheath and pilot wires connecting the secondaries of said transformers for opposing electromotive forces, differential electroresponsive means for controlling said circuit controlling means comprising an operating winding connected in series relation with said pilot circuit, an earthing lead connecting a point in said pilot circuit adjacent said electroresponsive means and not at equal potential displacement from said pilot wires to ground, a restraining winding in circuit with said earthing lead arranged to produce an effect proportional to the capacity current to ground of said pilot circuit and opposed to the effect of the capacity current between the pilot wires on the operating winding of said electroresponsive means whereby said electroresponsive means is rendered inoperative on the capacity current between said pilot wires.

4. In an alternating current electric system, protective means wherein the input of electric energy into a section of the system is balanced against the output therefrom, comprising circuit controlling means adjacent the ends of a section of the system, a current transformer adjacent each end of said section, a pilot circuit having a high capacity to ground and comprising pilot wires connecting the secondaries of said transformers for opposing electromotive forces, relatively insensitive electroresponsive means for controlling one of said circuit controlling means connected in series relation with said pilot circuit, relatively sensitive electroresponsive means for controlling another of said circuit controlling means connected in series relation with said pilot circuit, an earthing lead connecting a point in said pilot circuit not at equal potential displacement from said pilot wires to ground, a winding in circuit with said earthing lead arranged to produce an effect on said relatively sensitive electroresponsive means proportional to the capacity current to ground of said pilot circuit and opposed to the effect exerted by the capacity current between the pilot wires on said relatively sensitive electroresponsive means whereby the same is rendered inoperative on the capacity current between pilot wires and a normally open circuit between said pilot wires arranged to be closed by said relatively sensitive electroresponsive means in response to a fault within said section of the system whereby substantially the full electromotive force of one of said transformers is impressed upon the relatively insensitive electroresponsive means.

5. In an alternating current electric system, protective means wherein the input of electric energy into a portion of the system is balanced against the output therefrom, comprising circuit controlling means at each of two points of the system, a current transformer at each of said points, a pilot circuit comprising a cable having an earthed sheath and pilot wires connecting the secondaries of said transformers for opposing electromotive forces, electroresponsive means having a relatively high fault setting and connected in series relation with said pilot circuit for controlling one of said circuit controlling means, electroresponsive means having a relatively low fault setting and connected in series relation with said pilot circuit for controlling the other of said circuit controlling means, an earthing lead connecting a point in said pilot circuit adjacent said electroresponsive means having the low fault setting and not at equal potential differences with respect to said pilot wires to ground, a winding in circuit with said earthing lead arranged to produce an effect on said electroresponsive means having the low fault setting proportional to the capacity current to ground of said pilot circuit and opposed to the effect exerted by the capacity current between the pilot wires on said electroresponsive means having the low fault setting whereby the same is rendered inoperative on the capacity current between pilot wires, and a normally open circuit between said pilot wires arranged to be closed by said electroresponsive means having the low fault setting in response to a fault on said system between said points whereby substantially the full electromotive force of one of said transformers is impressed upon the electroresponsive means having the high fault setting.

6. In an alternating current electric system, protective means comprising a static electric transformer, a core therefor, a primary winding on said core connected to receive operating current, a secondary winding on said core inductively related to said primary winding, a restraining winding on said core so disposed as to produce substantially no electromotive force at the terminals of said primary and secondary windings but adapted to be energized to regulate the flux set up by the primary winding caused by any given operating current, and an electroresponsive device arranged to be controlled by the resultant current induced in the secondary winding.

7. In an alternating current electric system, protective means comprising a static electric transformer, a core therefor, a primary winding on said core connected to receive operating current, a secondary winding on said core inductively related to said primary winding, a restraining winding on said core inductively related to said primary and secondary windings but so disposed on said core as to produce substantially no electromotive force in said primary and secondary windings and adapted to be energized to regulate the flux set up by the primary winding caused by any given operating current, an air gap in the magnetic circuit of said restraining winding adapted to control the restraining effect thereof, and an electroresponsive device arranged to be controlled by the resultant current induced in the secondary winding.

In witness whereof I have hereunto set my hand this 28th day of August, 1922.

ALAN STEWART FITZ GERALD.